US008221029B2

(12) United States Patent
Henry et al.

(10) Patent No.: US 8,221,029 B2
(45) Date of Patent: Jul. 17, 2012

(54) WATER DRAINAGE AND HARVESTING SYSTEM FOR AN ARTIFICIAL TURF ENVIRONMENT

(75) Inventors: Eric M. Henry, Albuquerque, NM (US); Terry J. McMains, Rio Rancho, NM (US); Tanya R. Sanchez, Albuquerque, NM (US)

(73) Assignee: Tanya R. Sanchez, Albuquerque, NM (US)

( * ) Notice: Subject to any disclaimer, the term of this patent is extended or adjusted under 35 U.S.C. 154(b) by 0 days.

(21) Appl. No.: 12/783,020

(22) Filed: May 19, 2010

(65) Prior Publication Data

US 2010/0294705 A1    Nov. 25, 2010

Related U.S. Application Data

(60) Provisional application No. 61/180,552, filed on May 22, 2009.

(51) Int. Cl.
*E02B 13/00* (2006.01)
(52) U.S. Cl. .......................................... 405/36; 405/52
(58) Field of Classification Search ............ 405/36–41, 405/43–46, 49, 52, 53
See application file for complete search history.

(56) References Cited

U.S. PATENT DOCUMENTS

| 3,625,011 A | 12/1971 | Stevenson |
| 4,366,846 A | 1/1983 | Curati, Jr. |
| 5,810,510 A * | 9/1998 | Urriola ........................... 405/45 |
| 5,823,711 A | 10/1998 | Herd et al. |
| 5,848,856 A | 12/1998 | Bohnhoff |
| 5,890,838 A | 4/1999 | Moore, Jr. et al. |
| 5,976,645 A | 11/1999 | Daluise et al. |
| 6,382,237 B1 | 5/2002 | Takai |
| 6,626,609 B1 | 9/2003 | Kotani et al. |
| 6,991,402 B2 | 1/2006 | Burkhart |
| 7,114,877 B2 | 10/2006 | Wilkerson |
| 7,147,401 B2 | 12/2006 | Wickens |
| 7,473,055 B2 | 1/2009 | Sheridan |
| 2006/0115328 A1 | 6/2006 | Smyers, Jr. |
| 2007/0267418 A1 | 11/2007 | Takai |
| 2008/0095580 A1* | 4/2008 | Blackwood ..................... 405/45 |
| 2008/0240860 A1 | 10/2008 | Ianniello |

OTHER PUBLICATIONS

Clean Washington Center (CWC)—Plastics Recycling Technical Assistance Report—Mar. 1999 www.cwc.org/plastic/pl992fs.pdf.*

* cited by examiner

*Primary Examiner* — David Bagnell
*Assistant Examiner* — Kyle Armstrong
(74) *Attorney, Agent, or Firm* — Greer, Burns & Crain, Ltd.

(57) ABSTRACT

A water drainage and harvesting system for use with an artificial turf field comprises permeable synthetic turf, permeable impact-absorbing sub-base material beneath the turf, a water collection basin below the field, a water reservoir below the collection basin, the basin and reservoir having an impermeable liner, a water tank in the reservoir, and a conduit from the tank that allows for filtered water to be pumped to the ground surface for reuse. The disclosure further relates to a method for the construction of such a water storage and conveyance system.

20 Claims, 5 Drawing Sheets

WATER DRAINAGE AND HARVESTING SYSTEM FOR AN ARTIFICIAL TURF ENVIRONMENT

CROSS-REFERENCE

This application claims priority under 35 U.S.C. §119 from U.S. Provisional Patent Application Ser. No. 61/180,552, filed May 22, 2009.

FIELD OF THE INVENTION

The following invention relates to drainable artificial turf fields and other fields to drain water from the field surface and store such water for later use. More particularly, this invention relates to a subterranean system which drains water from a field surface, filters the water, and stores the filtered water beneath the field surface where it is accessible by way of a conduit.

BACKGROUND

Before the invention of artificial turf in the 1950s, natural grass was essentially the only way to create a playing field or landscape a park. Natural grass can be difficult to maintain, particularly in intemperate climates, and requires maintenance. In 1966, Astroturf was first installed in a professional sports complex in the Texas Astrodome and provided a year-round green playing field that did not need watering or aerating, and had none of natural grass's problems with insects or rodents.

Initially, artificial turf environments were little more than a synthetic carpet laid over concrete. Unlike natural grass, rainwater had no where to go. It would pool on top of the fabric, creating an unplayable surface. To address the problem outdoor fields were crowned so that the water would run off to the sides where it could then be managed by traditional drainage techniques. As artificial turf systems evolved, improvements were made in the safety and playability of the field as well as its drainage capabilities. Addition of drainage holes throughout the synthetic turf material and underlying base allowed the fields to be constructed flat and made them playable in any weather condition. These drainage capabilities also led to numerous drainage solutions under the field. Synthetic turf fields installed today have drainage systems installed under the field. U.S. Pat. Nos. 7,114,877 to Wilkerson and 7,147,401 to Wickens discloses drainage systems comprised of perforated pipes under the field to direct water swiftly away from the surface, most often into a storm drain. Variations on these methods are now common practice. Conventional artificial turf surfaces, unlike natural grass, do not absorb water and are designed to drain swiftly. As a result, millions of gallons of water are directed into storm drains each year from just one conventional sports field. In regards to sustainability of what is quickly becoming a scarce resource, this practice is irresponsible.

Water conservation is becoming increasing important to society. Further, there is increasing societal focus on sustainable products and systems. With these goals in mind, rainwater harvesting is becoming increasingly important and utilized worldwide. However, rainwater harvesting faces major obstacles including finding a catchment surface that will produce a sufficiently large volume of uncontaminated water. With hardscape catchment surfaces, such as pavement, asphalt, and rooftops, rainwater must be directed to a collection point. A certain amount of water is lost through absorption and evaporation. Contamination of water while it is being collected and conveyed is also a problem. Accordingly, it is challenging to find a catchment surface that is sizeable enough to produce a significant yield, will minimize water absorption and/or evaporation, and will not introduce contaminates into the water.

Several attempts have been made to provide rainwater collection systems for parks and playgrounds, as shown for example in U.S. Pat. Nos. 6,626,609 to Kotani et al., and 5,848,856 to Bohnhoff. However, these systems have not been entirely satisfactory and have not gained widespread commercial acceptance.

OBJECTS OF THE INVENTION

It is an object of the invention to provide an improved storm water management system for a field, preferably an artificial turf playing field, comprising of a rainwater collection and storage system.

More specifically, it is an object of the invention to provide an improved drainage system for an artificial turf field that rapidly and efficiently drains water from the playing surface.

It is also an object of the invention to manage storm water directly on site by storing the water directly beneath the field rather than draining the water away from the site using traditional infrastructure.

It is also an object of the invention to provide an improved rainwater harvesting system with a large catchment surface, that minimizes water loss through absorption and evaporation, and that minimizes contamination of the water.

SUMMARY OF INVENTION

In attaining one or more of the forgoing objects, a drainage solution is provided for a synthetic turf field that includes an efficient rainwater harvesting system. More specifically, the water storage and conveyance system of the invention comprises a permeable synthetic turf field, a substantially impermeable liner beneath the field defining a water reservoir, a water storage tank within the reservoir, at least one access conduit extending from the tank, and permeable backfill material surrounding the tank, filling the reservoir, and supporting the field. Although the present invention has particular application to artificial turf, the water storage and conveyance system can be used in connection with natural grass or any other permeable surface coverings. The artificial turf surface comprises a substantially permeable drainable backer. This allows water to drain rapidly through the entire area of the artificial turf to the underground water retention reservoir and prevents it from collecting on the surface. The substantially impermeable liner allows water that is gravitationally drained through the artificial turf surface to collect in a predefined area and prevents the water from seeping into the surrounding soil. The water tank is constructed within the water reservoir. The tank preferably comprises a multiplicity of preformed plastic units, but other tank embodiments are contemplated. A layer of geotextile filter fabric substantially envelopes the water tank. The term "geotextile" as used herein means any permeable textile material which provides for water flow and acts as a filter fabric to substantially retain particulate material, for example, to keep back fill, silt and sediment out of the tanking system. Permeable or free-drain backfill material, preferably a mixture of sand and gravel, is placed in the water reservoir substantially around and over the water tank. This structure naturally filters the water as it is gravitationally drawn downward through the water reservoir and into the water storage tank. The conduit connects the water storage tank with the ground surface. A pump in cooperation with the conduit allows filtered water to be pumped from the water storage tank to the ground surface for use as it is needed. The water storage and conveyance system of the invention captures rainwater from substantially the entire area of the artificial turf field, filters it, and stores the water beneath the field for subsequent use. The stored water can be used in any desired manner, such as irrigation of the surrounding landscape as the water does not have to be additionally filtered. This also makes it easy to tie into existing irrigation lines.

The system of the invention manages storm water directly on site instead of using traditional infrastructure techniques to manage the water, whether that means using pipes to direct water into storm drains, or by creating retention or detention ponds. Conventional systems often treat the water as a liability or nuisance rather than as an asset. The system of the invention is essentially entirely contained beneath and within the area of the playing field, providing a long lasting water resource on site.

Thus, the system of the invention provides a solution for several problems in the art. The system provides excellent drainage across the entire playing surface. Because a sports field provides a substantial catchment surface the system will produce a significant yield. Losses due to absorption and evaporation are minimized. The water is naturally filtered and risks of contamination are minimized. Accordingly, a single field can capture, store and re-use millions of gallons of water each year that would otherwise be directed into storm drains.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Figure 1:
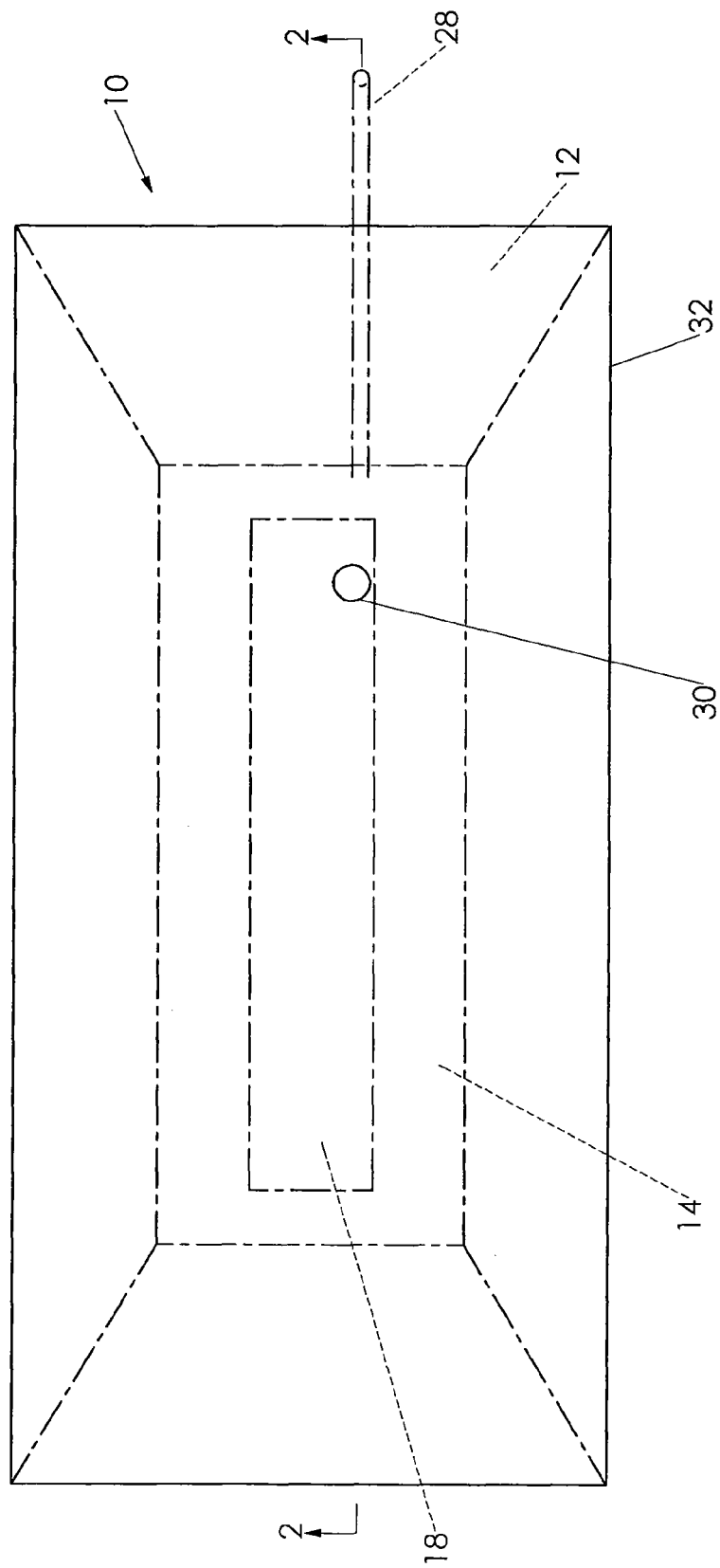
FIG. 1 shows a top plan view of the water drainage and harvesting system for an artificial turf environment.

The invention will now be described in more detail with reference to the accompanying schematic drawings which for the purpose of exemplification show currently preferred embodiments of the invention. Like reference numerals represent like parts throughout the various drawings.

The water drainage and harvesting system 10 of the invention comprises an artificial turf field 32 with a water retention reservoir 14 located beneath the surface of the field. Although artificial turf is preferred, because of its swift drainage capabilities, natural grass or another permeable surface covering could be used in lieu of turf. A water collection basin 12 collects water over a wide area, preferably co-extensive with the field 32 and gravitationally directs the water into the water retention reservoir 14 for storage. The bottom perimeter of collection basin 12 meets with the top perimeter of the reservoir 14. Water retention reservoir 14 includes a water storage tank 18. Water retention reservoir 14 is constructed by excavating a trench beneath the field, lining the trench with an impermeable liner 16, and backfilling the trench with permeable backfill material 22, such as sand and gravel, that functions to filter the rainwater.

In an optional, alternative embodiment, the system 10 can be used for temporary storm water storage, using passive infiltration technique to return the storm water directly to the ground water table. Specifically a portion of the non-permeable liner 16 in the trench excavation under the storage tank 18 can be omitted or replaced with a permeable geotextile. In this optional embodiment storm water is initially stored in the reservoir and tank, and over time is permitted to passively seep into the ground water table.

Figure 2:
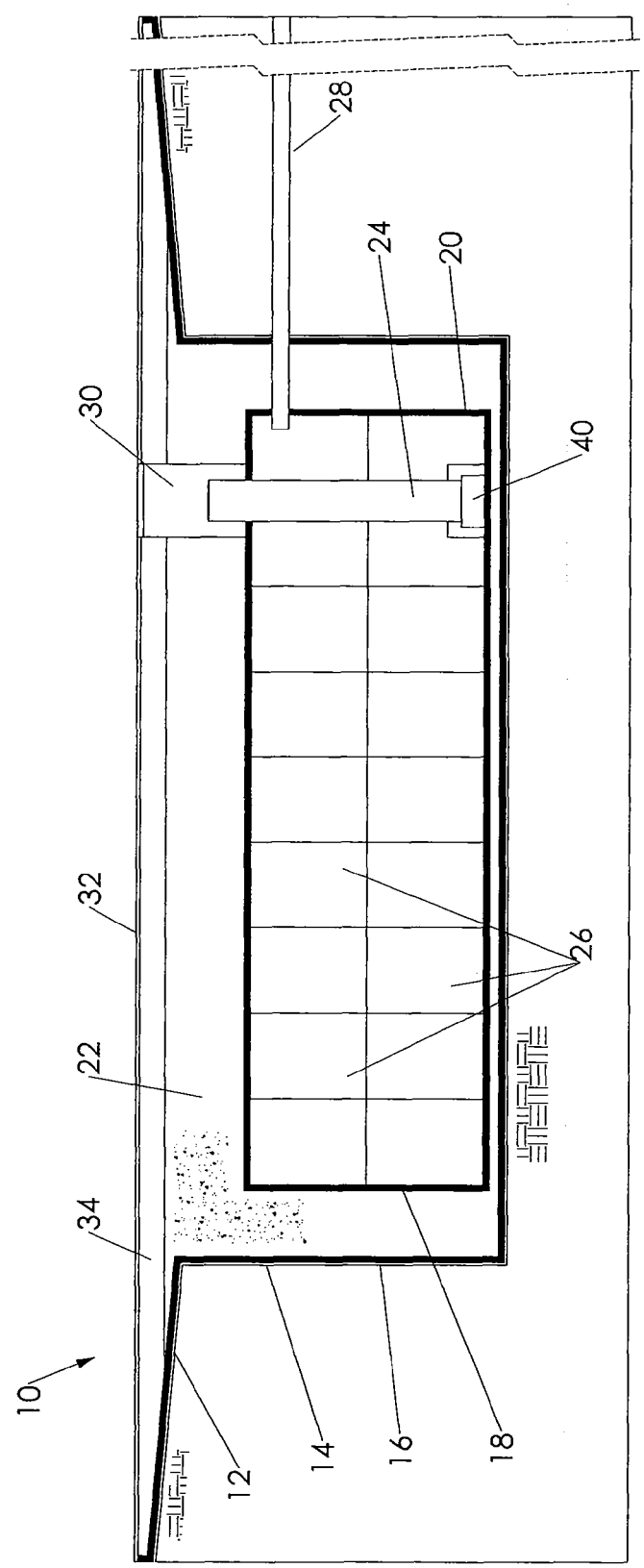
FIG. 2 is a cross-sectional view of the water drainage and harvesting system for an artificial turf environment taken along line 2-2 of FIG. 1.

The water storage tank 18 is a load bearing structure that forms a void space for water storage. Although a prefabricated tank could be used, each of the preferred tank embodiments of the invention are constructed on site. The embodiments of the invention provide a more economical solution than prefabricated tanks. In a first embodiment, the water tank 18 comprises a prefabricated subunit structure 26 preferably at or near the bottom of the reservoir 14 as shown in FIG. 2. The subunit structure 26 can be constructed by assembling pre-molded plastic boxes on-site. Recycled plastic boxes made up of supporting cross beams have good load bearing capacity and create over 95% void space in which to store water. This is the preferred method of tank construction for the invention because of its ability to be constructed to any capacity with minimal excavation. It is also the embodiment that creates the largest percentage of void space by volume. There are multiple manufacturers of these boxes, including EcoRain Systems, Inc. located at 14320 Ventura Blvd. #402 Sherman Oaks, Calif. 91423 USA, and Atlantis Corp. located at 3/19-21 Gibbes Street, Chatswood, NSW 2067, Australia. In lieu of a prefabricated subunit structure, the water tank 18 may comprise one or more steel culverts, stone backfill, concrete vaults or any other means for creating a significant void volume for storing water. Alternative embodiments of tank 18 are described below.

One or more layers of permeable geotextile 20 substantially covers the entire outer surface of the water tank 18. Geotextile 20 functions to allow collected water to pass through but keeps backfill material 22 and sediments from entering tank 18.

The backfill material 22 is preferably a compactable combination of sand and gravel. The sand and gravel in the backfill material 22 filters the water before it percolates into tank 18. A sand and gravel mixture is preferred as it not only has a high porosity, but it acts as a cleaning mechanism for the water, re-creating the natural effect of underground aquifers. Backfill material 22 surrounds tank 18 and substantially fills reservoir 14.

A conduit 24 provides ground-level access to the water held in the water retention reservoir 14. Conduit 24 may be constructed of PVC, but other materials can be used. Conduit 24 preferably extends to the bottom of water tank 18. A filter (not shown) can be installed at the lower end of the conduit to additionally clean the water as needed for the intended application. Conduit 24 is connected to a riser 30. Preferably, riser 30 includes a closeable and lockable cap to control access to the stored water and prevent contamination of the water, e.g., by ground water runoff. To access the water, a submersible water pump can be located within the conduit or as an alternative, an external water pump can also be located in nearby pump housing depending on the project and intended usage of the water.

The configuration of the water storage tank 18 and location of the conduit 24 and riser 30 can be custom designed for each installation. In most cases the tank will not be exactly centered as shown in FIG. 1. The tank is preferable located to minimize excavation. In one preferred embodiment, one end of the tank extends beyond the field's playing surface, thus making it easy to locate a vertically orientated conduit, riser, and cap off the playing surface.

An overflow pipe 28 is connected into and upper portion of the water tank 18 at a predetermined level. Overflow pipe 28 directs excess water away from the water retention reservoir 14 when the water retention space is at full capacity. Various systems are contemplated for directing the excess water away from the water retention reservoir 14 including, but not limited to, pipes to convey the excess water to a storm sewer.

Sub-base layer 34 comprises a compactable material with good porosity, such as crusher fines, which form a stable base for the field. The sub-base material is placed over backfill 22 in collection basin 12 to create the sub-base layer 34. Drainable synthetic turf 32 is laid over sub-base layer 34, creating the water catchment surface. Synthetic turf 32 is preferably installed with an impact absorbing infill material which promotes safety for those playing on the field. Infill material can be composed of sand and/or rubber, as well as completely organic infills that are made up of coconut fibers and cork. Other infill materials or foam shock pads are also an alternative. The synthetic turf system is the top dressing in the system of the invention, and there are numerous installation techniques and infill or shock absorption options. For the purposes of the present system any of these variations are workable and can be specified by the end user, as long as the synthetic turf has sufficient drainage functionality.

Figure 3:
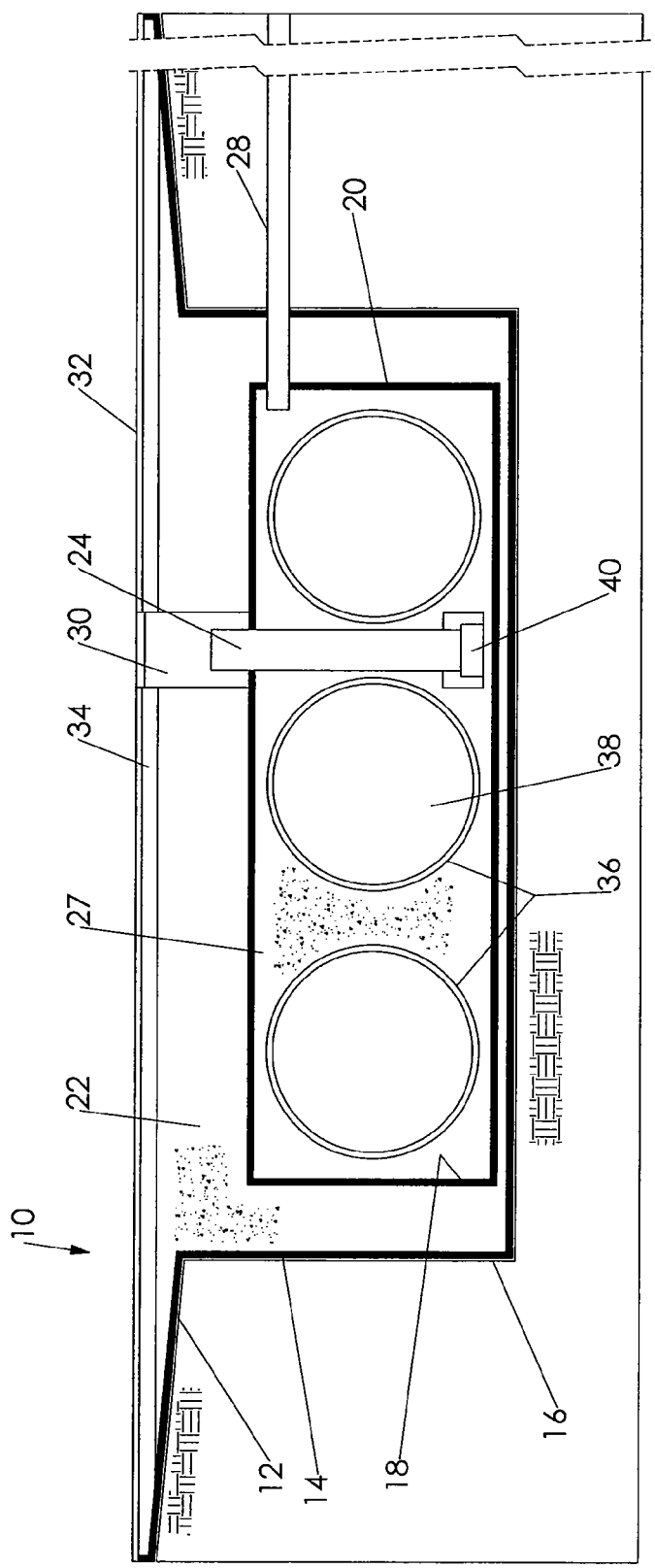
FIG. 3 is a cross-sectional view similar to FIG. 2 showing a second embodiment of the water storage tank.

FIG. 3 illustrates a second embodiment of the invention in which the water storage tank 18 comprises one or more culvert sections 36. The culvert sections 36 preferably comprise pre-formed corrugated metal or concrete pipes placed at or near the bottom of the reservoir 14. Culvert sections 36 are preferably perforated to improve water flow into the hollow interior 38. Crushed stone 27, gravel and/or other permeable backfill material may be placed over and between sections 36. The remaining components of the water storage system are the same as described above.

Figure 4:
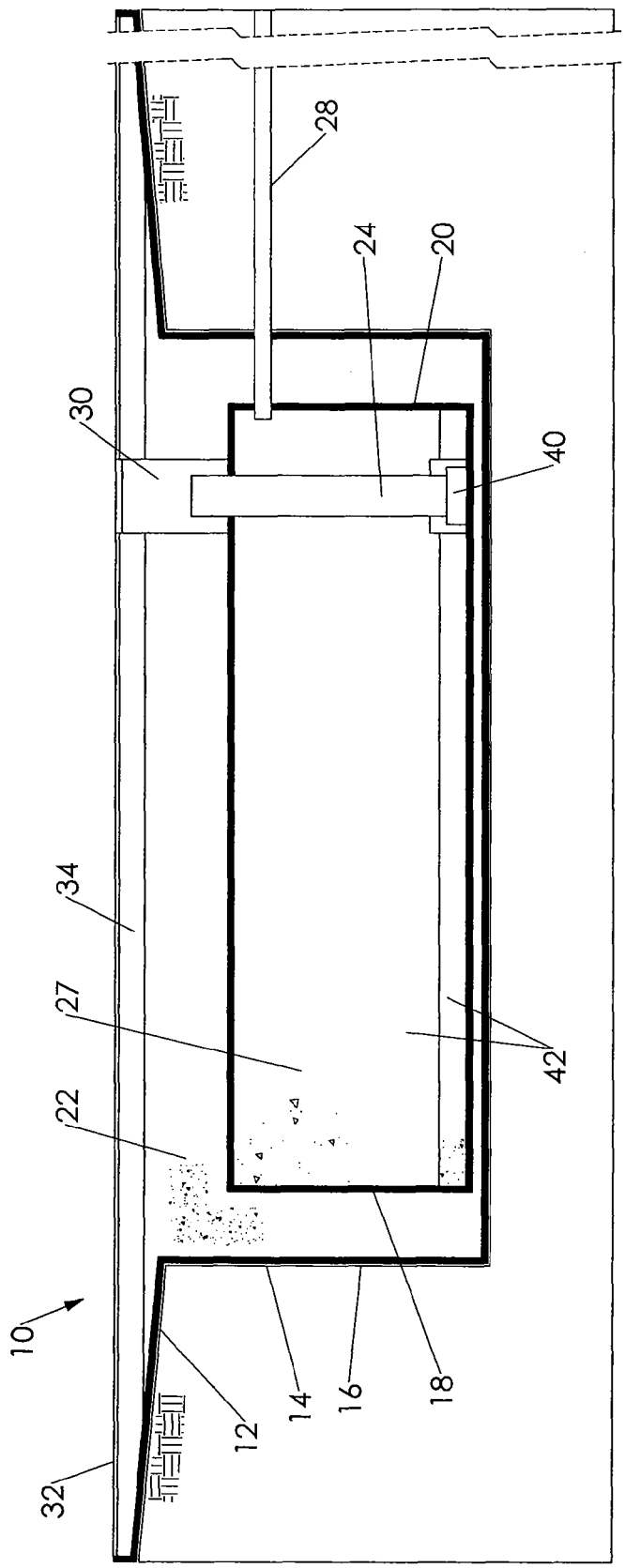
FIG. 4 is a cross-sectional view similar to FIG. 2 showing a third embodiment of the water storage tank.

FIG. 4 shows a third embodiment of the invention in which the water storage tank 18 comprises a stone bed 42 having a significant void space for retention and storage of the collected water. Stone bed 42 may comprise plural layers of stone 27 or crushed rock. The bed preferable is covered with geotextile fabric to prevent the gravel and sand backfill, which has a smaller particle size, from migrating into the stone bed. Water travels through the remaining layers of the system as described above.

Figure 5:
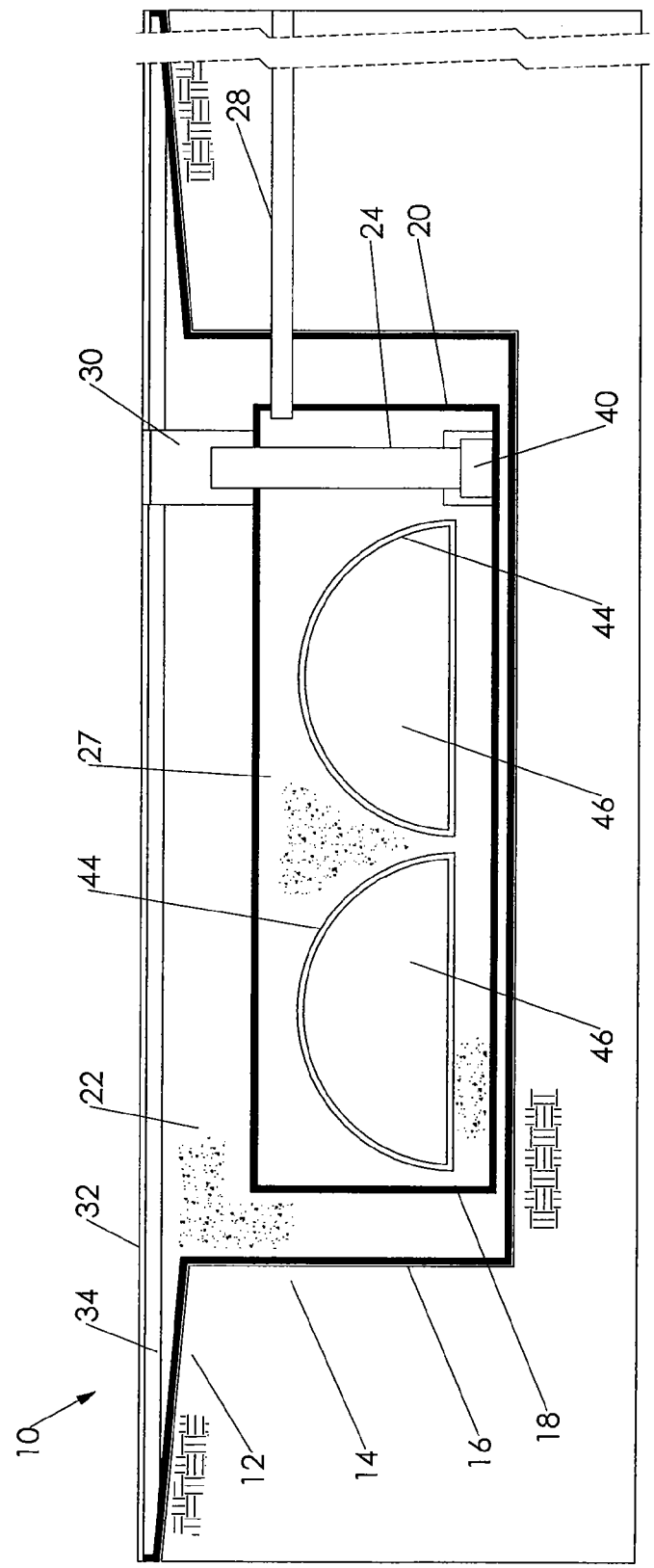
FIG. 5 is a cross-sectional view similar to FIG. 2 showing a fourth embodiment of the water storage tank.

FIG. 5 illustrates a fourth embodiment of the invention in which the water storage tank 18 comprises one or more arched vaults 44. The arched vaults 44 are constructed from pre-formed concrete, corrugated metal or corrugated plastic pieces and placed at or near the bottom of the reservoir 14. Vaults 44 are preferably perforated. Water is stored in the interior 46 of the arched vaults. Crushed stone 27 may be placed over and between vaults 36. The remaining components of the water storage system are the same as described above.

To construct the water drainage and harvesting system for an artificial turf environment, a trench is excavated of sufficient size and depth to form the water retention reservoir 14 and to accommodate the water storage tank 18. The excavation may have substantial vertical side walls, depending on soil conditions. The dimensions are selected for the type and size of water retention reservoir required for each particular project. An extended area beyond the trench is excavated and graded to form a water collection basin 12 that is sloped toward the trench. The area of the collection basin 12 is preferably commensurate with the field as shown, but can be a smaller or larger area. The expanded area of the collection basin provides and enhanced catchment surface to maximize water collection and storage. The water collection basin 12 is preferably sloped at about a 1% grade to direct the flow of water to the water retention reservoir 14.

After the site has been excavated, a substantially impermeable liner 16 is installed covering the inside of the water collection basin 12 and reservoir 14. A layer of permeable backfill material 22 is then placed on the bottom of the water retention reservoir 14. The backfill material 22 may comprise, but is not limited to, a clean sand and gravel mixture.

Next, geotextile 20 is laid over the backfill material 22 with a sufficient amount of excess fabric to substantially enclose tank structure 18. Tank structure 18 is constructed on geotextile 20 within the water retention reservoir 14. After this construction is completed, the excess geotextile 20 is folded over the tank structure 18 so that it substantially envelopes the structure on all sides.

Conduit 24 is installed connecting the bottom of the water tank 18 with what will be the ground surface when the excavated area is filled in. A pump 40 is preferably installed at a lowermost end of the conduit so that it may pump collected water from within the water storage tank 18 to a desired location for re-use. The geotextile is substantially sealed around the conduit 24 connection so as not to allow sediment to seep into the filtered water inside the water tank structure 18. Backfill material can then be placed within reservoir 14 around tank 18 up to the level of overflow pipe 28. Overflow pipe 28 is installed and connected to the water retention reservoir 14 for conveying overflow away from the site.

Once overflow pipe 28 is properly connected, the remaining backfill material 22 is placed and compacted within the collection basin 12 to form a substantially level surface 6-12 inches below the finished grade.

Next, sub-base layer 34 is placed over the top of compacted backfill material 22 up to a level slightly below the finished grade. The sub-base 34 is compacted to a desired density. Finally, the drainable artificial turf 32 is installed over the compacted sub-base 34.

When rain falls onto the artificial turf 32 surface, the turf material 32 allows for water to drain through the turf 32, keeping the field surface itself substantially dry. The sub-base layer 34 is permeable. Water that passes through the artificial turf 32 surface, pass through sub-base 34 into backfill material 22. Within backfill layer, the water is filtered as it is gravitationally pulled downward. When collected water reaches the impermeable liner 16, the grading of the floor of the collection basin 12 directs the water to the center of the field and into the water retention reservoir 14.

As the water level at the bottom of the water retention reservoir 14 rises, water will migrate through the geotextile 20 surrounding the tank 18 and into the subunit structure 26. Geotextile 20 surrounding the tank structure prevents the backfill material as well as silt and other sediments from washing into the tank. The water inside the tank structure 18 is accessible via the conduit 24. Other than access conduit 24 and overflow pipe 28, the system of the invention is free of water collection pipes that can become clogged or broken. The system allows a significant amount of water to be collected under an artificial field surface without complicated filtering mechanisms. Substantially all of the water that falls on the surface is readily accessible for re-use, such as irrigation and other non-portable demands.

Although the invention has been described with respect to specific embodiments, the appended claims are not to be thus limited but are to be construed as embodying all modifications and alternative constructions that may occur to one skilled in the art which fairly fall within the scope of the claims.

What is claimed is:

1. A water storage and harvesting system comprising:
a permeable field on a ground surface;
a substantially impermeable liner beneath the permeable field defining a water retention reservoir, said reservoir having sides and a bottom, said impermeable liner covering the reservoir sides and bottom;
a water storage tank within said reservoir above the bottom of the water retention reservoir and below the permeable field;
at least one access conduit extending from said storage tank for drawing water out of said tank for subsequent use;
water filtering backfill material in said reservoir between said impermeable liner and said tank and at least partially surrounding said water storage tank; and
geotextile between said backfill material and said storage tank.

2. The water storage and harvesting system of claim 1 further comprising an overflow pipe connected to an upper portion of said water storage tank for conveying overflow water from said tank.

3. The water storage and harvesting system of claim 1 further comprising a pump connected to said at least one access conduit for drawing water from said storage tank.

4. The water storage and harvesting system of claim 1, wherein said water storage tank comprises a multiplicity of preformed sub-units.

5. The water storage and harvesting system of claim 4, wherein said preformed sub-units comprise recycled plastic boxes.

6. The water storage and harvesting system of claim 1, wherein said storage tank comprises at least one section of perforated pipe.

7. The water storage and harvesting system of claim 1, wherein said storage tank comprises one or more arched vaults.

8. The water storage and harvesting system of claim 1, wherein said storage tank comprises a stone bed.

9. The water storage and harvesting system of claim 1, wherein substantially the entirety of said water storage and conveyance system is contained beneath said field.

10. The water storage and harvesting system of claim 1, further comprising an opening in said reservoir liner beneath said water storage tank for passive water infiltration to the ground water table.

11. A water storage and harvesting system comprising:
an artificial turf field;
a water retention reservoir below the field, said reservoir having sides and a bottom, and having, an impermeable liner covering the reservoir sides and bottom,
a water collection basin below said field, said collection basin having a sloped floor to convey water from said field to said reservoir, said collection basin having a substantially impermeable liner;
a water tank within said reservoir, said tank having a plurality of substantially permeable sides;
water filtering backfill material between said reservoir liner and said water tank, and at least partially filling said collection basin;
geotextile fabric between said water tank and said backfill material, said geotextile substantially covering the permeable sides of said tank;
a conduit connected to a lower portion of said tank for drawing water out of said tank for re-use; and
an overflow pipe connected to an upper portion of said tank.

12. The water storage and harvesting system of claim 11, wherein said tank comprises a multiplicity of recycled plastic boxes.

13. The water storage and harvesting system of claim 11, further comprising a pump connected to said at least one conduit.

14. The water storage and harvesting system of claim 11, wherein said sloped floor of said water collection basin is graded from outer edges of said artificial turf field to top edges of said water reservoir at about a 1 percent grade.

15. A method for constructing a water storage and harvesting system, the method comprising the steps of:
excavating a trench having sides and a bottom;
excavating an area around and adjacent to said trench to create a water collection basin, said collection basin having a floor sloped toward said trench;
lining said trench sides and bottom with a substantially impermeable liner to form a reservoir;
lining said collection basin with a substantially impermeable liner;
placing a layer of permeable backfill material on the bottom of said reservoir;
constructing a tank in said trench, said tank having at least one permeable surface for receiving water;
connecting a conduit to said tank for drawing water out of said tank;
covering said at least one permeable surface of said tank with a layer of geotextile;
back filling said reservoir around said tank with permeable backfill material;
installing an overflow pipe from an upper portion of said tank;
back filling a lower portion of said collection basin with permeable backfill material;
placing a layer of crusher fine over the backfill material in the upper portion of said collection basin; and
laying an artificial turf field over said crusher fine of said collection basin, said synthetic turf being substantially permeable.

16. The method of claim 15, further comprising installing a pump at the base of said conduit for pumping water from said tank.

17. The method of claim 15, wherein said conduit connecting step comprises connecting said conduit so that a lower most end of said conduit is substantially at a bottom of said tank.

18. The method of claim 15, wherein said tank constructing step comprises assembling a multiplicity of plastic modular units in said reservoir.

19. The method of claim 15, wherein said tank construction step comprises placing a plurality of perforated pipe sections in said reservoir.

20. The method of claim 15, wherein said tank construction step comprises placing arched perforated vaults in the reservoir.

* * * * *